United States Patent Office 3,493,516
Patented Feb. 3, 1970

3,493,516
CARBOXYLATE MODIFIED PHENATES
Nylen L. Allphin, Jr., Pinole, and Andrew D. Abbott, Greenbrae, Calif., assignors to Chevron Research Company, San Francisco, Calif., a corporation of Delaware
No Drawing. Filed May 4, 1966, Ser. No. 547,439
Int. Cl. C10m 1/38
U.S. Cl. 252—33.3     5 Claims

ABSTRACT OF THE DISCLOSURE

Alkalinity value in the preparation of overbased phenates is enhanced by the addition of aliphatic carboxylic acids of from 1 to 6 carbon atoms to the reaction mixture during the preparation of the overbased alkyl phenate. The overbased phenates are sulfurized alkaline earth metal alkyl phenates having a minor amount of an oil soluble sulfonate. These compositions find use in lubricating oils.

---

This invention concerns a novel composition for use in compounding lubricating oil compositions and a method for its preparation. More particularly, this invention concerns a novel overbased phenate composition having high alkalinity and a method for its preparation.

Basic sulfurized alkaline earth metal alkylphenates, particularly calcium and barium, are used as compounding agents in lubricating oils to neutralize harmful acids in internal combustion engines and to inhibit corrosion, piston rig sticking and gum formation resulting from oxidation of the lubricating oil and oxidative polymerization of the engine fuel residues. Increasing demands on the detergency, dispersancy and acid neutralizing capabilities of sulfurized alkaline earth metal alkylphenates have led to continual improvements in the phenates, as well as increasing amounts of alkaline earth metal being incorporated in the phenates. Because of the already high weight percents of alkaline earth metal present in sulfurized alkylphenates by presently available processes, adding additional small increments of alkaline earth metal have become very difficult.

Pursuant to this invention, overbased alkaline earth metal alkylphenates, exemplified by calcium, are prepared having high alkalinity values by combining a sulfurized alkylphenol with lime at elevated temperatures according to known processes and incorporating into the composition a small amount of a relatively low molecular weight carboxylic acid to form the calcium carboxylate. The calcium salt of the low molecular weight carboxylic acid may be prepared in situ or prepared prior to its introduction into the phenate composition.

The low molecular weight carboxylic acids which are used may be mono- or dibasic and are from 1 to 6 carbon atoms, more usually of from 1 to 2 carbon atoms. They may be substituted or unsubstituted having oxygen containing substituents such as alkoxyl, hydroxyl, and non-oxo carbonyl.

Illustrative low molecular weight carboxylic acids are formic acid, acetic acid, glycolic acid, glyoxylic acid, propionic acid, malonic acid, etc.

The carboxylic acid or acids may be added at anytime during the process of preparing the sulfurized calcium alkylphenate, but before the carbonation of the composition. The acids may be added neat or as concentrated solutions in a convenient solvent such as water, ethylene glycol, etc. Only one or a mixture of acids may be used.

The mole ratio of the low molecular weight carboxylic acid to phenate (based on phenolic hydroxyl) will generally be in the range of 0.5 to 2, more usually in the range 0.8 to 1.5.

A process for the preparation of overbased phenates may be found in U.S. Patent No. 3,178,368 and application Ser. No. 518,551, filed Jan. 4, 1966, by A. D. Abbott and N. L. Allphin, Jr., now U.S. Patent No. 3,367,867.

Various methods of preparing sulfurized alkylphenols are known in the art. The particular method employed is not critical to this invention. U.S. Patent No. 2,409,867 describes the method of sulfurizing using sulfur monochloride and the alkylphenol in an inert solvent. U.S. Patent Nos. 2,680,096 and 3,178,368 describe sulfurizing using sulfur with calcium phenoxide in the presence of ethylene glycol.

The alkylphenol will usually have alkyl groups having an average of from about 9 to 18 carbon atoms, each alkyl group being of from about 9 to 35 carbon atoms. The alkyl groups may be branched chain or straight chain, but usually at least 60 mole percent of the alkyl groups will be branched chain, e.g. polypropenyl.

Depending on the method of sulfurization, various solvents or dispersants may be used. Illustrating such solvents are hydrocarbonaceous fluids used as lubricating oils, inert hydrocarbons, both aromatic and aliphatic, etc. The concentration of the reactants may be varied widely. In sulfurizing with sulfur, the weight ratio of sulfur to alkylphenol will be in the range of about 1:0.9–10, usually about 1:2–6. When calcium oxide is used as the catalyst, the weight ratio of sulfur to calcium oxide will generally be about 4–10:1. Ethylene glycol will usually be added in small amounts.

Elevated temperatures are used for the sulfurization, the temperature depending on the particular reactants. Generally, sulfurization temperatures with sulfur will be in the range of about 200° to 350° F. The reaction will be carried out so that the water of reaction is removed as formed or after most of the sulfurization has occurred.

The sulfurized alkylphenol, either as the phenol or calcium salt, will generally have from about 5 to 12 weight percent sulfur.

Alternatively, the sulfurization can be carried out in the presence of all of the reactants used in the carbonation. That is, all or almost all of the materials to be used in the preparation of the overbased phenate are added together, including sulfur, and the sulfurization carried out by heating the mixture to a temperature at which sulfurization occurs.

The overbased phenates may now be prepared by combining the sulfurized alkylphenol prepared above, either neat or preferably in a suitable dispersant, at elevated temperatures with calcium, generally in the form of its oxide or hydroxide (lime), in the presence of a glycol, a high molecular weight alkanol, and an alkaline earth metal sulfonate. Also included is the low molecular weight carboxylic acid. After most of the water has been driven off, the reaction mixture is then carbonated followed by filtration. Normally, an antifoaming agent is then added, although the antifoaming agent may be added at any time during the preparation of the overbased phenate.

Before considering the particular process steps, the various materials used will be considered.

The basic sulfonates which are employed contain from 0 to 300 percent, usually 0 to 100 percent, of metal in excess of the metal of normal sulfonates—essentially neutral metal sulfonates. See U.S. Patent No. 3,178,368. By neutral metal sulfonates are intend sulfonates wherein the sulfonic acid moiety and the metal moiety are present in equivalent amounts. The nature of metal sulfonates permits an excess of metal cation to be dispersed in an essentially hydrocarbon medium, the excess metal cation probably being complexed.

The basic sulfonates used herein are derived from neutral sulfonates represented by the formula:

$$[(R^1)_a A S O_3]_2 M^1$$

wherein $R^1$ is a high molecular weight straight chain or branched chain, saturated or unsaturated, essentially hydrocarbon radical, usually aliphatic, having a molecular weight of about 150 to about 800; A is an aromatic hydrocarbon radical, such as benzene, naphthalene, anthracene, etc.; A is a number having the value of 1 to 4; and $M^1$ is calcium.

Examples of suitable hydrocarbon radicals for the sulfonate are the following: Dodecane, hexadecane, eicosane, triacontane radicals; radicals derived from petroleum hydrocarbons, such as white oil, wax, etc.; radicals derived from olefin polymers, such as polyproplyene or polybutylene, etc. The sulfonic acids used in preparing the basic sulfonates of this invention also include the oil soluble sulfonic acids obtained from petroleum, such as the mahogany acids, and the synthetic sulfonic acids prepared by various methods of synthesis.

The metal sulfonates are exemplified as follows: calcium white oil benzene sulfonate, calcium dipolypropylene benzene sulfonate, calcium mahogany petroleum sulfonate, calcium triacontyl benzene sulfonate, etc.

The high molecular weight alcohol, which is used in amounts of not more than 75 weight percent of the sulfurized alkylphenol charge, preferably 10 to 50 weight percent, are those monohydric alcohols containing from about 8 to 18 carbon atoms, preferably 9 to 15 carbon atoms. These alcohols are exemplified as follows: octyl alcohol, decyl alcohol, dodecyl alcohol, tridecyl alcohol, tetradecyl alcohol, hexadecyl alcohol, etc.

A polyhydric alcohol of from 2 to 3 carbon atoms, usually ethylene or proplyene glycol, is used. A sufficient amount of the glycol is employed to bring the reactants into efficient contact for substantial reaction in a reasonably short time; that is, the amount of alcohol used is sufficient to dissolve at least portions of the reactants and thus provide substantial contact between them. For this purpose it is beneficial to use certain ratios by weight of the calcium oxide or hydroxide to glycol. The calcium: glycol mole ratio may vary from 3 to 1 to about 0.25 to 1, preferably from about 2 to 1 to about 1 to 1.

Various alkaline earth metal oxides or hydroxides may be used, e.g. barium oxide, calcium oxide or calcium hydroxide. The description will refer to calcium as exemplary. The amount of oxide or hydroxide used will depend on whether calcium cation has been used in the sulfurization of the alkylphenol and the amount of calcium desired in the final product. It is found that at least about 80 percent of the inorganic calcium added is incorporated into the product, so that an excess of from about 5 to 20 weight percent of calcium over that to be incorporated in the final product will be employed.

The weight ratio of the total amount of calcium source, e.g., calcium oxide or hydroxide, used—both during sulfurization and subsequent calcium addition—based on sulfurized alkylphenol will be from about 0.25 to 0.7, more usually from about 0.45 to 0.6.

The several components which are used in this process are used in certain mole proportions with respect to each other. For each mole of alkylphenol, it is desirable to use from 0.01 to 1 mole of sulfonate, preferably from about 0.01 to 0.05 mole, from 0.1 to 1.5 moles of high molecular weight alcohol, and at least about 1.5 to 4 moles of calcium.

The carbon dioxide used is from about 300 mole percent to 10 mole percent, preferably 150 mole percent to 10 mole percent of the alkylphenol charged.

Generally, when preparing the phenates, a lubricating oil will be used as a reaction medium. Thus, by such use of a lubricating oil, oil concentrates of the desired highly basic carbonated sulfurized calcium phenate can be obtained directly. Such lubricating oils include a wide variety of lubricating oils, such as petroleum derived oils: naphthenic base, paraffin base, asphaltic base and mixed base lubricating oils; other hydrocarbon lubricants, e.g., lubricating oils derived from coal products and the synthetic oils, e.g., alkylene polymers; as well as non-hydrocarbon lubricating oils such as the alkylene oxide type polymers; etc.

The amount of reaction medium, e.g., oil, will generally be from about 10 to 55 weight percent of the total composition, more usually from about 15 to 40 weight percent of the total composition during the reaction, and from about 35 to 45 weight percent of the final composition after removal of the glycol and all or part of the high molecular weight alcohol.

Also included in the final composition is from about 0.0005 to 0.01 weight percent of the total composition of an antifoaming or defoaming agent.

In preparing the overbased carbonated sulfurized calcium alkylphenates, the order in which the various materials are combined is not critical with the exception of carbonation. Generally, it is convenient to add all of the reactants with the exception of the sulfurized alkylphenol to the reactor—this need not include the low molecular weight carboxylic acid—heat the reactants to a temperature in the range of about 300° to 400° F. and remove the water formed by the reaction between the lime and any hydroxylic species present. After removal of the water, the sulfurized alkylphenol is then added while maintaining an elevated temperature in the above-indicated range. Any additional water which is formed is then removed, the water usually bringing with it some glycol and high molecular weight alcohol.

Alternatively, as previously described, the sulfurized alkylphenol may be formed in situ, removing the water of reaction as formed.

The low molecular weight carboxylic acid can be added initially, that is, prior to the addition of the sulfurized alkylphenol or concomitant with the addition of the sulfurized alkylphenol or during the removal of water after the addition of the sulfurized alkylphenol.

After heating the reaction mixture for from about one-half hour to about two hours, carbonation is begun by introducing gaseous carbon dioxide into the reaction mixture at relatively moderate pressures, e.g., less than 50 p.s.i.g. The carbonation is exothermic and cooling may be required to maintain the temperature in the desired range. The temperature during carbonation is usually in the range of about 275° to 375° F.

At the end of this time, the glycol is removed by distillation, using a moderate vacuum. Generally, the temperature is maintained in the range of about 350° to 500° F. and the pressure in the range of about 10 to 150 mm. Hg. Also, as desired, from about 30 to 100 percent of the high molecular weight alcohol may be removed. The product is filtered, any convenient method of filtration being used. After filtration, the product is ready to be used as a detergent in lubricating oils.

The composition and properties of the final product are as follows:

TABLE I

| | Composition, weight percent | |
|---|---|---|
| | Broad range | Narrow range |
| Sulfurized alkylphenol sulfur (combined with alkylphenol)[1] | 20–50 | 25–40 |
| Sulfonic acid | 3–8 | 4–6 |
| Carbon dioxide | 4–7 | 4–6 |
| Ca[2] | 9–11 | ≥9–10.5 |
| Monohydric alcohol (>8 carbon atoms) | 0–10 | 0–7 |
| Carboxylic acid | 5–14 | 6–10 |
| | Properties | |
| Viscosity, SUS (ASTM D 446) 210° F | [3] 300–700 | |
| Alkalinity value | 252–308 | |

[1] Weight percent of S is included in sulfurized alkylphenol weight percent.
[2] The Ca is in combined form with the various acidic species present in the composition.
[3] The weight percent of oil will be in the range of 35 to 45 weight percent of the composition.

The remainder of the composition is the base oil. Of course, the above-indicated compositiin may be diluted so that the above weight percents are relative to each other, and not absolute. The base oil will usually be about 15 to 55 weight percent in the concentrate.

The following examples are offered by way of illustration and not by way of limitation.

EXAMPLE A

Exemplary preparation of overbased sulfurized alkylphenol in the absence of carboxylic acid Into a kettle was introduced 348 g. of tetrapropenylphenol, 302 g. of a Mid-Continent 100 oil, 108.5 g. of tridecyl alcohol, and 36.5 g. of basic calcium sulfonate (derived from 480 neutral oil) containing 40 percent calcium in excess of that amount for a neutral sulfonate and the mixture heated to 170° F. Into the mixture was then added 165 g. of lime and 73 g. of sulfur and the temperature raised to 270° F. 101.5 g. of glycol was then added and the temperature raised over a two hour period to 340° F. while water was taken overhead.

The temperature was dropped to 325–330° F. and 52 g. of carbon dioxide bubbled into the mixture over a 2.5 hour period. The temperature was then slowly raised to 390° F. while the pressure was reduced to 40 mm. Hg.

Analysis of the mixture is as follows: Alkalinity value (mg. KOH/gm. of sample)=243 (equivalent 8.66% calcium); S, 3.85%; Viscosity 210° F., SUS=681.4.

EXAMPLE I

The procedures of Example A was followed. Into a kettle was introduced 278.4 g. of tetrapropenylphenol, 242 g. of a Mid-Continent 100 oil, 87 g. of tridecyl alcohol, and 29 g. of basic calcium sulfonate (derived from 480 neutral oil) containing 40 percent calcium in excess of that amount for a neutral sulfonate and the mixture heated to 170° F. To this mixture was then added 176 g. of lime and 58.4 g. of sulfur and the temperature raised to 270° F. Glycol (108 g.) was then added and the temperature slowly raised over a period of 2½ hours to 340° F. while taking water overhead.

At this time, 36 g. of 90 percent formic acid and 52 g. of 70 percent glycolic acid were added slowly over a 45 minute period while maintaining the temperature at about 320–330° F. The temperature was then slowly raised to 340° F. over a 1 hour and 15 minute period while taking water overhead and slowly adding 15 g. of tridecyl alcohol.

While maintaining the temperature or allowing it to drop slightly, 42 g. of carbon dioxide was evenly added over a 2.5 hour period. The temperature was then slowly raised to 390° F. while reducing the pressure to 40 mm. Hg, removing most of the water and unbound glycol. Analysis of the product was as follows: Alkalinity value (mg. KOH/gm. of sample)=280 (equivalent to 10.0% Ca); Viscosity 210° F., SUS=511.1.

EXAMPLE II

The procedure of Example I was followed, except that the amount of material introduced was reduced 10 percent and the formic acid and glycolic acid were added 15 minutes after the addition of the glycol.

Analysis of the product was as follows: Alkalinity value (mg. KOH/gm. of sample)=276–277 (equivalent to 9.9% Ca); Viscosity 210° F., SUS=602.1.

It is evident from the above results that by adding small amounts of low molecular weight carboxylic acids during the preparation of overbased alkylphenates, greater than 10 percent enhancements in the amount of calcium present is obtained. This is particularly significant in view of the already high weight percent calcium present in the composition. The enhanced amount of calcium provides greater neutralization capability and superior protection in the engine against sludge formation. Despite the great enhancement in calcium content, the viscosity remains sufficiently low to provide a tractable product.

As will be evident to those skilled in the art, various modifications on this invention can be made or followed, in the light of the foregoing disclosure and discussion, without departing from the spirit or scope of the disclosure or from the scope of the following claims:

We claim:

1. In a method for preparing overbased phenates which comprises combining with an alkaline earth metal oxide or hydroxide a sulfurized alkaline earth metal alkylphenate having from 5 to 12 weight percent sulfur and wherein the average number of carbon atoms in the alkyl group is in the range of 9 to 18, with no alkyl group greater than 35 carbon atoms, in the presence of a glycol of from 2 to 3 carbon atoms, an alkanol of at least 8 carbon atoms, an alkaline earth metal hydrocarbon sulfonate wherein said hydrocarbon is of from 150 to 800 molecular weight and a liquid hydrocarbon reaction medium at a temperature in the range from about 300° to 400° F., wherein the alkaline earth metal to glycol mole ratio is in the range of 3–0.25:1, the alkylphenol to sulfonate mole ratio is in the range of 1:0.01–1, the mole ratio of alkylphenol to alkanol is in the range of 1:0.1–1.5 and the alkaline earth metal to alkylphenol mole ratio is in the range of 1.5 to 4, removing the water of reaction overhead, adding carbon dioxide in an amount of from 10 to 300 mole percent based on alkylphenol, distilling glycol and alkanol overhead, leaving from 0 to 70 weight percent of the alkanol, the improvement which comprises adding prior to carbonation at least one aliphatic carboxylic acid of from about 1 to 6 carbon atoms, wherein the total amount of carboxylic acid added is from about 0.5 to 2 moles per mole of phenate.

2. A method according to claim 1, wherein said alkaline earth metal is calcium.

3. A method according to claim 2, wherein said carboxylic acid is formic acid.

4. A method according to claim 2, wherein said carboxylic acid is glycolic acid.

5. A method according to claim 2, wherein said carboxylic acid is a mixture of carboxylic acids of from 1 to 2 carbon atoms.

References Cited

UNITED STATES PATENTS

| | | | |
|---|---|---|---|
| 2,865,857 | 12/1958 | Walker | 252—18 XR |
| 3,178,368 | 4/1965 | Hanneman | 252—42.7 XR |
| 3,367,867 | 2/1968 | Abbott et al. | 252—42.7 XR |
| 3,372,116 | 3/1968 | Meinhardt | 252—42.7 XR |

DANIEL E. WYMAN, Primary Examiner

L. VAUGHN, Assistant Examiner

U.S. Cl. X.R.

252—18, 39, 42.7